(12) United States Patent
Lee et al.

(10) Patent No.: US 8,259,056 B2
(45) Date of Patent: Sep. 4, 2012

(54) METHOD AND DEVICE CAPABLE OF CONTROLLING SOFT-START DYNAMICALLY

(75) Inventors: Gin-Yen Lee, Hsinchu County (TW); Bin-Jung Tsai, Kao-Hsiung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1092 days.

(21) Appl. No.: 11/760,790

(22) Filed: Jun. 10, 2007

(65) Prior Publication Data

US 2008/0252236 A1 Oct. 16, 2008

(30) Foreign Application Priority Data

Apr. 10, 2007 (TW) ................. 96112471 A

(51) Int. Cl.
*G09G 3/36* (2006.01)
(52) U.S. Cl. ....................................... 345/102
(58) Field of Classification Search .................. 315/291, 315/307, 224; 345/76–104, 204–215, 690–699; 323/238, 321; 327/108–112
See application file for complete search history.

(56) References Cited

U.S. PATENT DOCUMENTS

| | | | | |
|---|---|---|---|---|
| 4,625,271 A * | 11/1986 | Chetty et al. | ............ | 363/49 |
| 5,930,121 A * | 7/1999 | Henry | ............ | 363/16 |
| 6,376,999 B1 * | 4/2002 | Li et al. | ............ | 315/307 |
| 6,894,442 B1 * | 5/2005 | Lim et al. | ............ | 315/291 |
| 6,933,710 B2 * | 8/2005 | Shieh | ............ | 323/282 |
| 6,954,364 B2 * | 10/2005 | Min | ............ | 363/56.08 |
| 7,176,948 B2 * | 2/2007 | Lewis | ............ | 345/691 |
| 7,348,960 B2 * | 3/2008 | Huang et al. | ............ | 345/102 |
| 7,414,371 B1 * | 8/2008 | Choi et al. | ............ | 315/291 |
| 7,531,971 B2 * | 5/2009 | Weng | ............ | 315/291 |
| 2002/0163371 A1 * | 11/2002 | Hall et al. | ............ | 327/175 |
| 2003/0127992 A1 * | 7/2003 | Cash | ............ | 315/291 |
| 2003/0174369 A1 * | 9/2003 | Sato et al. | ............ | 358/509 |
| 2003/0201967 A1 * | 10/2003 | Yu | ............ | 345/102 |
| 2004/0004596 A1 * | 1/2004 | Kang et al. | ............ | 345/102 |
| 2004/0124889 A1 | 7/2004 | Koharagi | | |
| 2005/0231127 A1 * | 10/2005 | Yamamoto et al. | ............ | 315/224 |
| 2006/0255753 A1 * | 11/2006 | Sawada et al. | ............ | 315/312 |
| 2007/0040517 A1 * | 2/2007 | Yu | ............ | 315/291 |

(Continued)

FOREIGN PATENT DOCUMENTS

SU 1416979 A * 8/1988

(Continued)

*Primary Examiner* — Alexander Eisen
*Assistant Examiner* — Patrick F Marinelli
(74) *Attorney, Agent, or Firm* — Winston Hsu; Scott Margo

(57) ABSTRACT

A back light boost converter includes an analog circuit, an enable controller, a logic device, and a digital PWM controller. The analog circuit generates a switch signal and a feedback signal based on a first pulse signal. The enable controller generates an enable signal based on an LED on ratio signal, an LED on cycle signal, a duty cycle signal, and a frequency signal. The logic device generates a second pulse signal based on the feedback signal and the enable signal. The digital PWM controller outputs the first pulse signal with increasing duty cycles in a plurality stages.

7 Claims, 5 Drawing Sheets

U.S. PATENT DOCUMENTS

| | | | |
|---|---|---|---|
| 2007/0115248 A1* | 5/2007 | Roberts et al. | 345/102 |
| 2007/0182347 A1* | 8/2007 | Shteynberg et al. | 315/312 |
| 2007/0236154 A1* | 10/2007 | Lee | 315/246 |
| 2007/0257645 A1* | 11/2007 | Nishino | 323/276 |
| 2007/0273681 A1* | 11/2007 | Mayell | 345/211 |
| 2008/0074058 A1* | 3/2008 | Lee et al. | 315/291 |
| 2008/0084196 A1* | 4/2008 | Lacombe et al. | 323/282 |
| 2008/0100224 A1* | 5/2008 | Felder et al. | 315/151 |

FOREIGN PATENT DOCUMENTS

| | | |
|---|---|---|
| TW | 200303704 | 9/2003 |
| TW | 200713165 | 4/2007 |

* cited by examiner

| PWM_I | | | | | | | | | | Fixed duty cycle |
|---|---|---|---|---|---|---|---|---|---|---|
| Stage | Idle | S0 | S1 | S2 | S3 | S4 | S5 | S6 | S0 | S7 | S8 | S9 | ⋯ |
| Duty Cycle | 0 | 1/32 | 3/32 | 5/32 | 7/32 | 9/32 | 11/32 | 13/32 | 15/32 | 17/32 | 19/32 | 21/32 | 23/32 | ⋯ |

Fig. 4

| Drv_freq [1:0] | | Output frequency of DRV |
|---|---|---|
| 0 | 0 | DCLK/32 |
| 0 | 1 | DCLK/64 |
| 1 | 0 | DCLK/128 |
| 1 | 1 | DCLK/256 |

Fig. 5

METHOD AND DEVICE CAPABLE OF CONTROLLING SOFT-START DYNAMICALLY

BACKGROUND OF THE INVENTION

1. Field of the Invention

The present invention is related to a method for controlling soft-start and related apparatuses, and more particularly, to a method for dynamically controlling soft-start and related apparatuses.

2. Description of the Prior Art

A digital pulse width modulation (PWM) circuit is often used in a back light boost converter. The PWM circuit determines whether to continue on outputting control signals to an analog circuit according to feedback signals of an analog circuit, so as to control a boosting procedure. In general, a soft-start mechanism is applied when the digital PWM circuit starts, in order to provide a specific pulse during the boosting procedure. The specific pulse has a fixed frequency, and a slowly increasing, long lasting duty cycle. The value of the specific pulse is related to application conditions and external unit values. Therefore, a power-on impulse current caused by an adding effect of inductance current can be prevented, and influences on designs of system circuits and power managements caused by electromagnetic interferences (EMI) can be avoided.

Please refer to FIG. 1, which illustrates a schematic diagram of a prior art back light boost converter 10. The back light boost converter 10 comprises a digital PWM controller 12 and an analog circuit 14. The analog circuit 14 comprises components such as resistors R, inductors L, capacitors C, diodes D, impedances Z, transistors Q, etc, and can generate a switch signal VLED and a feedback signal FB according to a pulse signal DRV for controlling a back light module. The PWM controller 12 generates a pulse signal DRV for controlling the analog circuit 14 according to the feedback signal FB.

In the prior art, soft-start time of the back light boost converter 10 is fixed. Unlike an analog PWM controller providing linearly increasing switch signals, the digital PWM controller 12 provides the switch signal VLED with duty cycles increasing by steps, so that when the back light module adjusts the switch time dynamically, the digital PWM controller 12 of the prior art is not able to achieve the soft-start mechanism using fixed time.

SUMMARY OF THE INVENTION

It is therefore a primary objective of the claimed invention to provide a method and device capable of controlling soft-start dynamically.

The present invention discloses a back light boost converter that can dynamically control soft-start, which comprises an analog circuit for generating a driving signal and a feedback signal for controlling a back light module according to a first pulse signal, an enable controller for generating an enable signal according to an LED on ratio signal corresponding to an active ratio of the enable signal and an LED on cycle signal corresponding to a period of the enable signal, a logic component for generating a second pulse signal according to the feedback signal and the enable signal, and a digital pulse width modulation (PWM) controller for outputting the first pulse signal in each of a plurality of stages according to the second pulse signal, wherein a duty cycle of the first pulse signal gradually increases or decreases after each of the plurality of stages.

The present invention further discloses a method for dynamically controlling soft-start, which comprises generating an enable signal according to an LED on ratio signal and an LED on cycle signal, obtaining a count number according to the LED on ratio signal and the LED on cycle signal, setting soft-start time according to the LED on ratio signal and the LED on cycle signal, outputting a reference pulse signal corresponding to a feedback signal when the enable signal comprises a trigger potential, outputting the count number of the reference pulse signals in a first stage for generating a first driving signal having a first duty cycle, outputting the count number of the reference pulse signals in a second stage for generating a second driving signal having a second duty cycle greater than the first duty cycle, outputting the count number of the reference pulse signals after the soft-start time for generating a third driving signal having a third duty cycle greater than the second duty cycle, and generating a driving signal for controlling a backlight module according to the third driving signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates a timing diagram of signals when the back light boost converter shown in FIG. 2 performs soft-start.

FIG. 5 illustrates a relationship between the value of a frequency signal and a driving signal.

DETAILED DESCRIPTION

Figure 1:
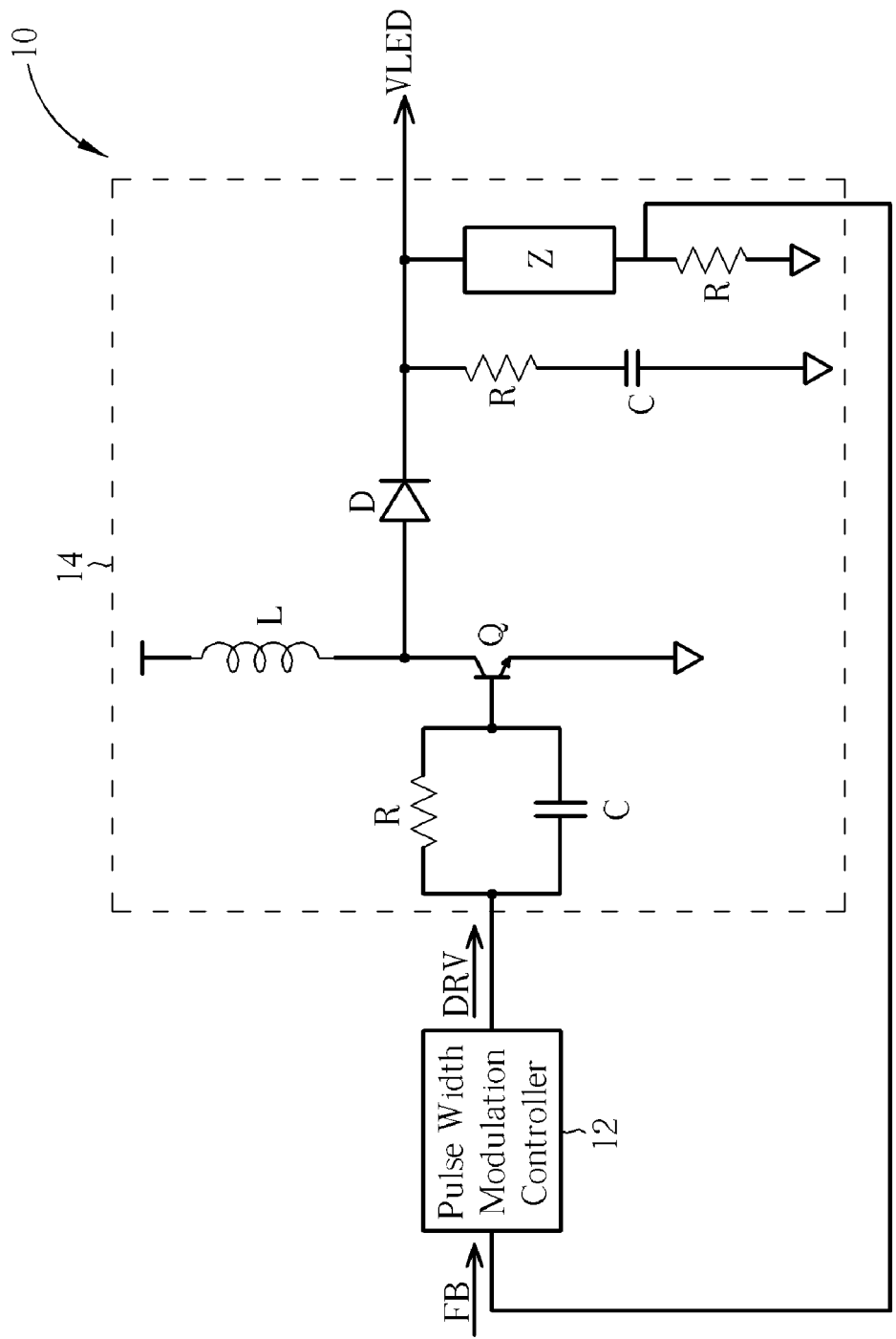
FIG. 1 illustrates a schematic diagram of a prior art back light boost converter.
Figure 2:
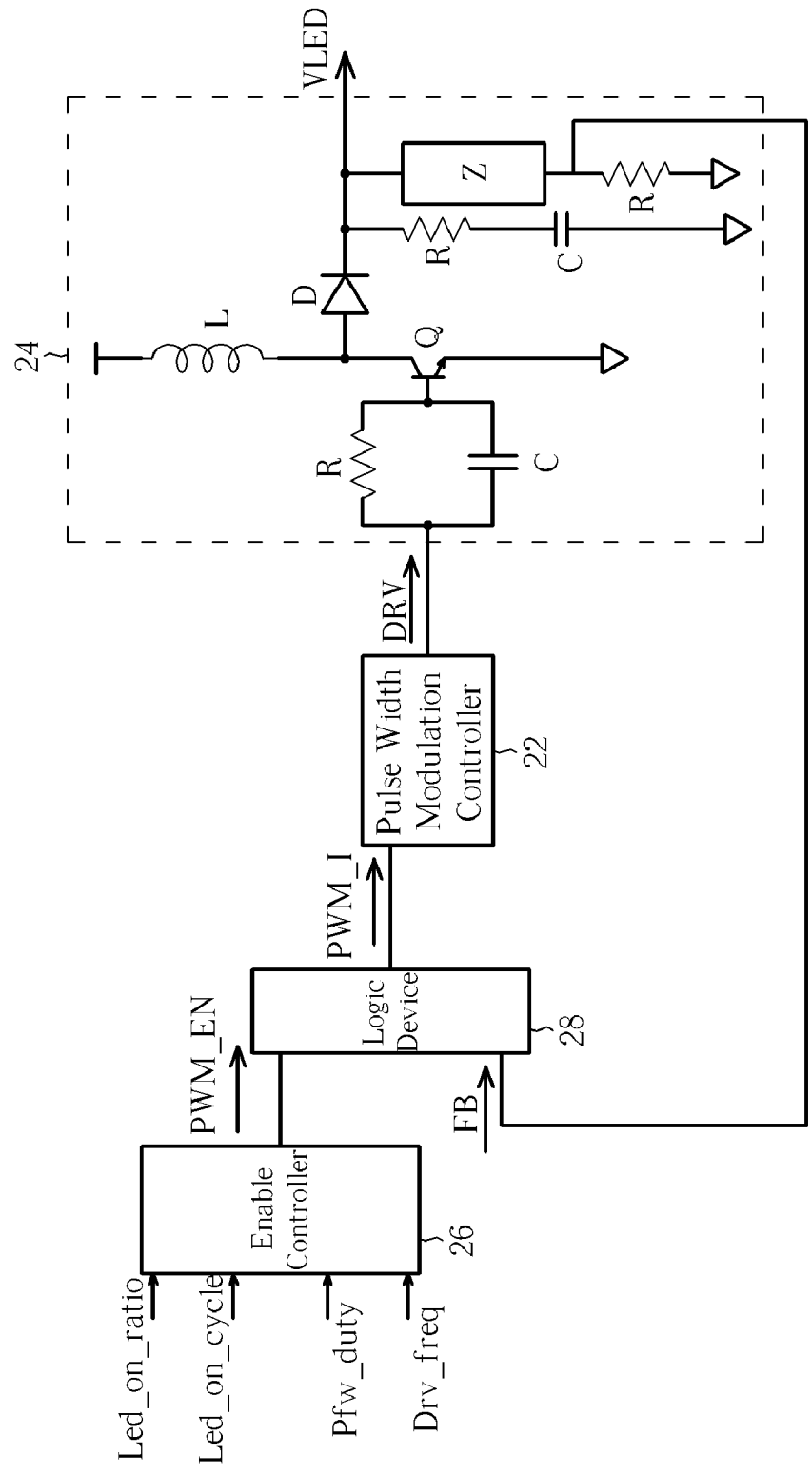
FIG. 2 illustrates a schematic diagram of a back light boost converter according to the present invention.

Please refer to FIG. 2, which illustrates a schematic diagram of a back light boost converter 20 according to the present invention. The back light boost converter 20 comprises a digital PWM controller 22, an analog circuit 24, an enable controller 26, and a logic device 28. The analog circuit 24 comprises components such as resistors R, inductors L, capacitors C, diodes D, impedances Z, transistors Q, etc, and can generate a switch signal VLED and a feedback signal FB for controlling the back light module. The enable controller 26 generates an enable signal PWM_EN for controlling an analog circuit 14 according to an LED on ratio signal Led_on_ratio, an LED on cycle signal Led_on_cycle, a duty cycle signal Pfm_duty, and a frequency signal Drv_freq. The logic device 28 can be an AND gate, and can generate a corresponding pulse signal PWM_I based on the enable signal PWM_EN and the feedback signal FB. The PWM controller 22 generates a driving signal DRV for controlling the analog circuit 24 according to the pulse signal PWM_I.

The LED on ratio signal Led_on_ratio, the LED on cycle signal Led_on_cycle, the duty cycle signal Pfm_duty, and the frequency signal Drv_freq are parameters related to soft-start performed by the back light boost converter 20. Note that, the present invention can be as effective without the duty cycle signal Pfm_duty and the frequency signal Drv_freq. An active ratio of the enable signal PWM_EN (a ratio of the trigger period and non-trigger period) can be set according to the LED on ratio signal Led_on_ratio. A period of the enable signal PWM_EN can be set according to the LED on cycle signal Led_on_cycle. A period of the back light boost converter 20 can be set according to the duty cycle signal Pfm_duty. A frequency of the driving signal DRV can be set according to the frequency signal Drv_freq.

Figure 3:
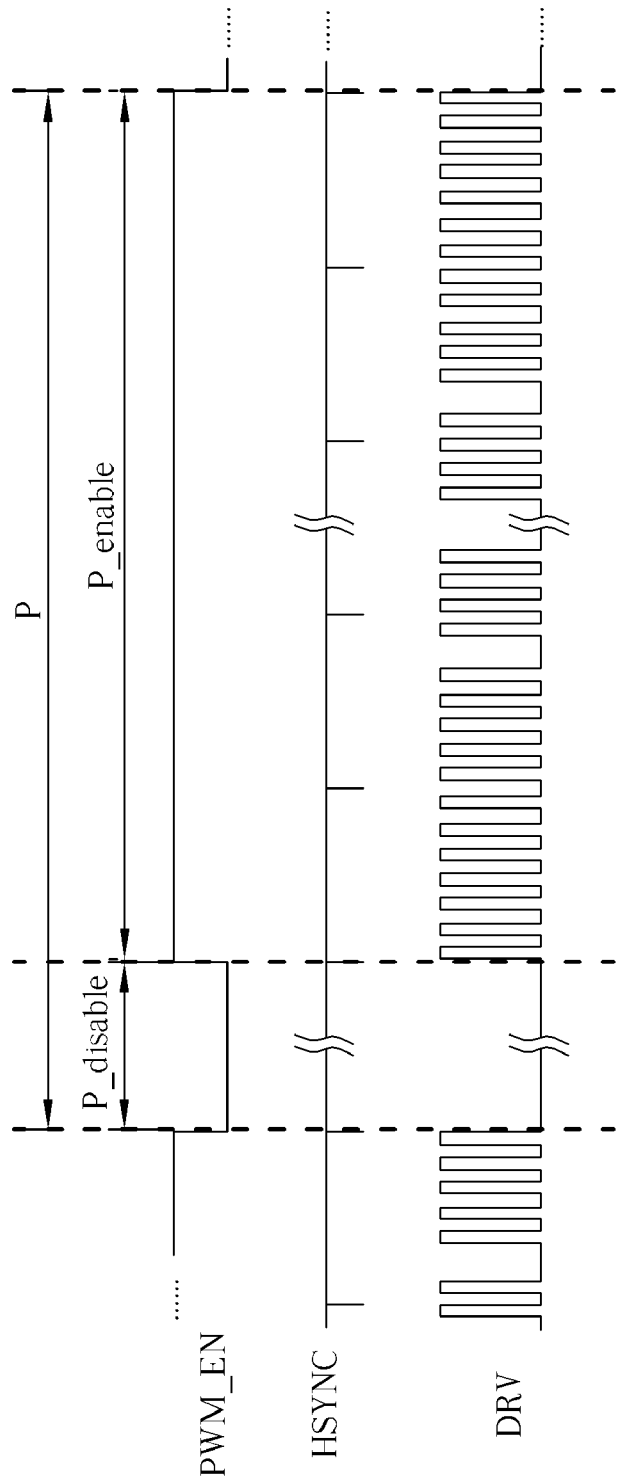
FIG. 3 illustrates a timing diagram of signals when the converter shown in FIG. 2 operates.

Please refer to FIG. 3, which illustrates a timing diagram of signals when the back light boost converter 20 operates according to the present invention. In FIG. 3, HSYNC represents a timing sequence of a scan line. If the system time is DCLK, the value of HSYNC is usually 640DCLK. A period P of the enable signal PWM_EN contains a trigger period P_enable and a non-trigger period P_disable. Suppose that the LED on cycle signal of the enable signal PWM_EN contains 16 LED on cycle signals Led_on_cycle, namely:

$$16*Led\_on\_cycle=16*(P\_enable+P\_disable)$$

The values of the trigger period P_enable and the non-trigger period P_disable are presented by the following equations:

$$P\_enable=Led\_on\_cycle*(Led\_on\_ratio*16)$$

$$P\_disable=Led\_on\_cycle*(16-Led\_on\_ratio*16)$$

Where Led_on_ratio is a coefficient between 0 and 1.

Therefore, the enable signal PWM_EN provided by the enable controller 26 can be presented by the following equation:

$$PWM\_EN=Led\_on\_cycle*Led\_on\_ratio*16*HSYNC$$

Please refer to FIG. 4, which illustrates a timing diagram of signals when the back light boost converter 20 performs soft-start according to the present invention. In FIG. 4, the back light boost converter 20 performs soft-start in 10 stages S0~S9, and each stage outputs a number PWM_NUM of driving signals DRV with a specific duty cycle. Because of the soft-start being divided into 10 stages, the duty cycles (the ratio of high potential and low potential) of the output driving signals DRV differ in different stages, thus the duty cycle rises gradually, and reaches the demanded duty cycle at the end (the duty cycle gradually decreases during switching off). In FIG. 4, if the demanded duty cycle is 23/32, after the back light boost converter 20 completes soft-start stages S0~S9, the duty cycles of the output signal are 1/32,3/32, . . . ,23/32 respectively, so it can prevent the power-on impulse current caused by the adding effect of the inductance current, and can avoid influences on designs of system circuits and power managements caused by electromagnetic interferences.

In the present invention, the frequency signal Drv_freq can be a 2-bit parameter. FIG. 5 illustrates the relationship between the value of the frequency signal Drv_freq and the driving signal DRV. As shown in FIG. 5, the period of the driving signal DRV can be generalized to $2^{Drv\_freq}*32DCLK$, the period of each stage of soft-start is $PWM\_NUM*2^{Drv\_freq}*32DCLK$, and time required for the overall soft-start (10 stages) is $10*PWM\_NUM*2^{Drv\_freq}*32DCLK$.

If the soft-start time is ¼ of the enable signal PWM_EN of the back light boost converter 20 but not limited, then set HSYNC as 640DCLK, and carry out soft-start with 10 stages, and that is:

$$(¼)*Led\_on\_cycle*Led\_on\_ratio*16*HSYNC=10*PWM\_NUM*2^{Drv\_freq}32DCLK$$

The number of switching of the digital PWM controller 22 can be represented by the following equation:

$$PWM\_NUM=8*Led\_on\_cycle*Led\_on\_ratio/2^{Drv\_freq}$$

As a result, the present invention can dynamically control the process of soft-start, perform soft-start with a plurality of stages according to the time length of the enable signal PWM_EN, output the number PWM_NUM of pulse signals with specific duty cycles during each stage, so that the duty cycle can rise gradually, and reach the demanded duty cycle at the end. Hence, the present invention can dynamically adjust the soft-start process with a fixed ratio of the enable signal PWM_EN.

Those skilled in the art will readily observe that numerous modifications and alterations of the device and method may be made while retaining the teachings of the invention.

What is claimed is:

1. A method for dynamically controlling soft-start comprising:

generating an enable signal according to a frequency signal, a backlight on ratio signal and a backlight on cycle signal;

obtaining a plurality of count numbers of reference pulse signals, wherein a value of each count number is directly proportional to X multiplied by the backlight on ratio signal multiplied by the backlight on cycle signal, and then divided by $2^{frequency\ signal}$, wherein X is a non-zero numerical value;

setting a soft-start time according to the backlight on ratio signal and the backlight on cycle signal;

outputting a first count number of the reference pulse signals in a first stage when the enable signal is at a trigger potential to initialize the soft-start time for generating a first driving signal having a first duty cycle;

outputting a second count number of the reference pulse signals in a second stage after the first count number of the reference pulse signals are outputted for generating a second driving signal having a second duty cycle greater than the first duty cycle; and outputting a third count number of the reference pulse signals after the soft-start time for generating an output driving signal having a third duty cycle greater than the second duty cycle for controlling a backlight module.

2. The method of claim 1 further comprising generating the turning-on ratio signal for setting an active ratio of the enable signal.

3. The method of claim 1 further comprising generating the backlight on cycle signal for setting a period of the enable signal.

4. The method of claim 1 further comprising generating a duty cycle signal for setting a period of the output driving signal.

5. The method of claim 1 further comprising generating the enable signal according to a duty cycle signal and a frequency signal.

6. The method of claim 5 further comprising generating the frequency signal for setting a frequency of the output driving signal.

7. The method of claim 1, wherein outputting the reference pulse signal corresponding to the feedback signal when the enable signal is at the trigger potential is outputting the reference pulse signal corresponding to the feedback signal when the enable signal is at a high logic potential.

* * * * *